April 10, 1928.

W. C. BROWER

PISTON CONSTRUCTION

Filed Nov. 18, 1925

1,665,438

INVENTOR.
William C. Brower
BY Prindle, Wright, Neal & Bean
ATTORNEYS.

Patented Apr. 10, 1928.

1,665,438

UNITED STATES PATENT OFFICE.

WILLIAM C. BROWER, OF GLOVERSVILLE, NEW YORK.

PISTON CONSTRUCTION.

Application filed November 18, 1925. Serial No. 69,742.

This invention relates to improvements in piston constructions and the object of the invention is the provision of a piston for internal combustion engines such as used for the propulsion of automobiles, motor vehicles and the like in which the "pumping" of the lubricating oil past the piston is prevented, which results in the increased efficiency in the engine, diminution in the matter of the formation of carbon on the piston head, prevention of loss of lubricating oil and other advantages obvious to those skilled in the art.

It is well known that in the operation of these internal combustion engines on the down stroke of the piston the lubricating oil, which is on the wall of the cylinder and on the outer surface, rings and in the ring grooves of the piston, is drawn or forced upwardly into the cylinder above the piston head due to the fact that a vacuum or partial vacuum is created there by the down stroke of the piston, and the crank-case pressure thus forces this lubricating oil up along the parts above referred to. Of course, it is understood that a quantity of the oil is held in the grooves for the rings and that this is forced by this pressure upwardly into the space in the cylinder above the piston head. This is called oil "pumping", and it is the purpose of this invention to eliminate this objectionable action.

To the accomplishment of the foregoing and such other objects as may hereinafter appear, this invention consists in the construction, combination and arrangement of parts hereinafter described and then sought to be defined in the appended claims, reference being had to the accompanying drawings forming a part hereof and which show for the purpose of illustrative disclosure two embodiments of my invention, it being expressly understood, however, that various changes may be made in practice within the scope of the claims without digressing from my inventive idea.

In the drawings—

Figure 1:
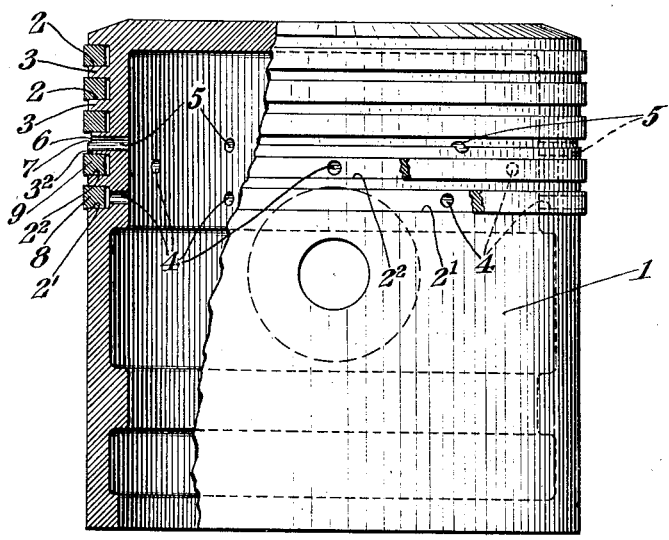
Figure 1 represents a view in side elevation and partial vertical cross section of a piston constructed to embody my invention.

In the drawings, the numeral 1 designates a piston head, the general construction of which is standard, it being understood that the same is hollow and adapted to reciprocate within and slidably engage the walls of the cylinder. This piston head is provided on its outside with a plurality of annular grooves 2 to receive the ordinary split and resilient piston rings. In forming these annular grooves 2 the piston head is left with a plurality of annular walls or ribs 3 in between the grooves 2.

In the lowermost groove or grooves 2, depending upon the number of the grooves provided, (see Figures 1 and 2) I provide a plurality of holes or apertures 4 opening from the bottom of the groove into the hollow interior or inside of the piston head. In the construction shown in Figure 1 I provide these holes or apertures 4 in the lower two grooves, whereas in the construction shown in Figure 2 I provide these holes or apertures in the lower groove only. In the annular wall or rib 3 located just above the upper groove 2 having the holes or apertures 4 therein, I provide a plurality of holes or apertures 5 which extend from the outer face of this wall or rib through the same and open into the hollow interior of the piston head 1. In additon, I reduce the outer face of the upper portion of this annular wall or rib having the holes or apertures 5 therethrough to form a depressed surface 6 and a medial shoulder 7. The holes or apertures 5 open partly through the depressed portion 6 and partly through the other portion of this wall or rib 3. In the form shown in Figure 1 the wall or rib 3 having the holes or apertures 5 is the second one ($3^2$) from the bottom, whereas in the construction shown in Figure 2 it is the first one from the bottom ($3^1$).

Figure 2:
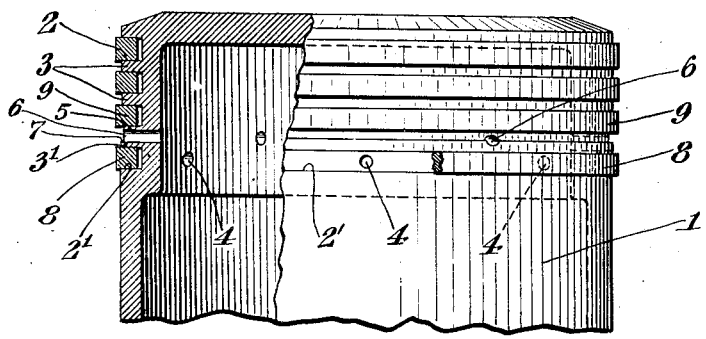
Figure 2 is a fragmentary view showing a slight modification in the structure, which also embodies my invention.

In operation, on the downward stroke of the piston within the cylinder the piston rings and particularly the lowermost rings 8 and 9 will remove the surplus lubricating oil from the inner surface of the piston and part of it will enter the lowermost grooves $2^1$ and $2^2$. In ordinary constructions this oil would be subject to the crank-case pressure due to the reduction in pressure in the cylinder because of the downward movement of the piston. However, when the pressure in the cylinder above the piston is reduced or a partial vacuum is created, the crank-case pressure is admitted through the holes or apertures 5 in the wall or rib $3^2$ in the one instance (Figure 1) and $3^1$ in the other instance (Figure 2). These holes or apertures 5 afford means of communication between the part of the cylinder above the wall or rib $3^2$ and $3^1$, as the case may be, and the crank-case pressure whereby the usual pressure tending to force the coil which is collected in the grooves $2^1$ and $2^2$ upwardly is neutralized or balanced and, therefore, the oil is free to flow by gravity through the holes or apertures 4 back into the crank-case. The reduction in the upper part of the face of the wall or rib $3^2$ and $3^1$ provides sufficient space for the admission of sufficient air pressure from the crank-case into the cylinder between the wall of the cylinder and the upper part of the outer face of the piston to accomplish this purpose regardless of how tight the remainder of the wall or rib $3^2$ (or $3^1$) fits this wall.

What I claim is:—

1. In combination, a piston head having a plurality of piston ring grooves formed therein with a plurality of annular walls or ribs located between said grooves, the lowermost of said grooves being provided with a plurality of holes or apertures extending from the bottom of said groove through the wall of the piston and opening into the hollow interior thereof, one of the walls or ribs above said last-mentioned groove being provided with a plurality of openings therethrough leading from the outer face thereof to the interior of the hollow piston so as to afford means of communication between the cylinder and the crank-case, said wall or rib having a reduced portion and the openings extending through both the reduced portion and the main portion of this rib or wall.

2. In combination, a hollow piston head having a plurality of piston ring grooves formed therein with a plurality of annular ribs or walls provided between said grooves, a plurality of passages between the interior of the piston head and the two lowermost of the said grooves, said passages opening into the bottom of said grooves and being adapted for the passage of lubricating oil from the grooves into the interior of the piston head, and a plurality of passages between the interior of the piston head and the outer surface of the annular rib or wall immediately above the two lowermost grooves, said passages opening through the outer face of said rib or wall whereby a means of communication is provided between the crank-case and the space between the upper part of the piston head and the cylinder in which the piston is adapted to be mounted, said rib or wall having a portion of its surface reduced and said openings being located in part in said reduced portion.

In testimony that I claim the foregoing, I have hereunto set my hand this 12th day of October, 1925.

WILLIAM C. BROWER.